US009022773B2

(12) United States Patent
Cadag et al.

(10) Patent No.: US 9,022,773 B2
(45) Date of Patent: May 5, 2015

(54) COMPENSATING MOLD PLUNGER FOR INTEGRATED CIRCUIT MANUFACTURE

(75) Inventors: Aaron Cadag, Calamba (PH);
BernieChrisanto Ang, Bantangas (PH);
Richard Laylo, Calamba (PH)

(73) Assignee: STMicroelectronics, Inc., Calamba, Laguna (PH)

( * ) Notice: Subject to any disclaimer, the term of this patent is extended or adjusted under 35 U.S.C. 154(b) by 161 days.

(21) Appl. No.: 13/340,142

(22) Filed: Dec. 29, 2011

(65) Prior Publication Data

US 2013/0168898 A1 Jul. 4, 2013

(51) Int. Cl.
*B29C 43/36* (2006.01)
*B29C 43/18* (2006.01)
*B29C 43/34* (2006.01)

(52) U.S. Cl.
CPC ............ *B29C 43/18* (2013.01); *B29C 2043/181* (2013.01); *B29C 43/34* (2013.01); *B29C 43/36* (2013.01); *B29C 2043/3444* (2013.01); *B29C 2043/3626* (2013.01); *B29C 2043/3652* (2013.01)

(58) Field of Classification Search
CPC ................................................. B29C 2043/181
USPC ............... 425/500, 501, 110, 112, 117, 125, 425/129.1, 383, 394, 398, 400, 461, 469, 425/344, 345, 346, 352, 354, 457, 168, 78, 425/353, 355, DIG. 127; 264/297.1, 320, 264/328.1, 328.2, 328.4, 328.5, 272.11, 264/272.15; 249/105, 109, 117, 136, 173; 29/450, 700; 156/261, 264; 438/127
See application file for complete search history.

(56) References Cited

U.S. PATENT DOCUMENTS

| | | | | | |
|---|---|---|---|---|---|
| 4,184,826 | A | * | 1/1980 | Reed et al. | 425/110 |
| 5,520,874 | A | * | 5/1996 | Chou et al. | 264/328.4 |
| 5,626,887 | A | | 5/1997 | Chou et al. | |
| 6,162,376 | A | * | 12/2000 | Mead | 264/2.4 |
| 6,821,822 | B1 | * | 11/2004 | Sato | 438/127 |
| 2006/0175734 | A1 | * | 8/2006 | Chen et al. | 264/272.14 |

* cited by examiner

*Primary Examiner* — Joseph S Del Sole
*Assistant Examiner* — Lawrence D Hohenbrink, Jr.
(74) *Attorney, Agent, or Firm* — Seed IP Law Group PLLC

(57) ABSTRACT

A device and method for manufacturing integrated circuit packaging using a mold plunger with position compensation in a manufacturing setting. In an embodiment, a compensating mold plunger, which may be used during the manufacture of an integrated circuit package, engages a die set on a carrier and within a bushing. This may be done to inject a mold compound on top of the die/carrier. If the bushing that is housing the die/carrier tandem is misaligned with the plunger in any lateral direction, the amount of pressure may be compromised. A compensating mold plunger includes a flexible portion that allows for the head of the plunger to properly engage the die/carrier despite any possible misalignments. Further, different die/carrier combinations may also be used with a compensating mold plunger because the pressure and force applied may be uniform inside a bushing despite the contents of the bushing.

27 Claims, 2 Drawing Sheets

COMPENSATING MOLD PLUNGER FOR INTEGRATED CIRCUIT MANUFACTURE

BACKGROUND

Integrated circuit (IC) manufacturing takes on many different steps beginning with fabrication and processing and ending with packaging and testing. In this overall process, one step of the manufacturing involves packaging die into molds for protection. As a wafer of dies is sawn into die size cuts, each die may then be attached to a carrier (e.g., a lead frame or a substrate) with glue or other means of die attaching material. Once attached, a box or snap curing oven may be used to cure the die attach material to prevent absorption of moisture which may lead to die separation from the carrier. After curing, interconnection between the die and the carrier may be accomplished using gold, aluminum, or copper wire. Once a die has reached this point, it may be ready to encapsulate using a molding process.

An encapsulation or molding process is designed to cover the interconnected die/carrier from any damage that may result from a harsh environment or mishandling. Molding may be a map type, single in line type, or a matrix type—techniques that are known in the industry. To accomplish molding, a mold compound pellet (i.e., a convenient starting shape of mold compound material) may be loaded into an encapsulation system. Then, as dies that are ready for encapsulation, a plunger engages the mold compound material at a specific temperature and pressure to force the mold compound to conform to the die/carrier. Thus, the plunger must be precise when engaging the mold compound or else an improper pressure may result which leads to an integrated circuit package with an increased likelihood of failure.

BRIEF DESCRIPTION OF THE DRAWINGS

The foregoing aspects and many of the attendant advantages of the claims will become more readily appreciated as the same become better understood by reference to the following detailed description, when taken in conjunction with the accompanying drawings, wherein:

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

By way of overview, the subject matter disclosed herein may be directed to a device and method for manufacturing integrated circuit packaging using a mold plunger with position compensation in a compression molding manufacturing setting. Compression molding is a method of molding in which a preheated molding material (generally called a mold compound) is first placed in an open, heated mold cavity (referred to as a pot bushing). The mold is closed with a top force or plunger member, pressure is applied to force the mold compound into contact with all mold areas, while heat and pressure are maintained until the molding material has cured. The process may further employ thermosetting resins in a partially cured stage, either in the form of granules, putty-like masses, or preforms. Compression molding is a high-volume, high-pressure method suitable for molding complex, high-strength packaging materials for integrated circuits.

In an embodiment, a compensating mold plunger, which may be used during the manufacture of an integrated circuit package, engages a die set on a carrier and within a pot bushing. This may be done to press a mold compound to surround the die/carrier. If the pot bushing that is housing the die/carrier tandem is misaligned with the plunger in any lateral direction, the amount of pressure and the temperature applied to the mold compound may be compromised. A compensating mold plunger includes a flexible portion that allows for the head of the plunger to properly engage the pot bushing despite any possible misalignments. Further, different die/carrier combinations may also be used with a compensating mold plunger because the pressure and force applied may be uniform inside a pot bushing despite the contents of the pot bushing. These and other aspects of the subject matter are discussed in greater detail below with respect to FIGS. 1-4.

Figure 1:
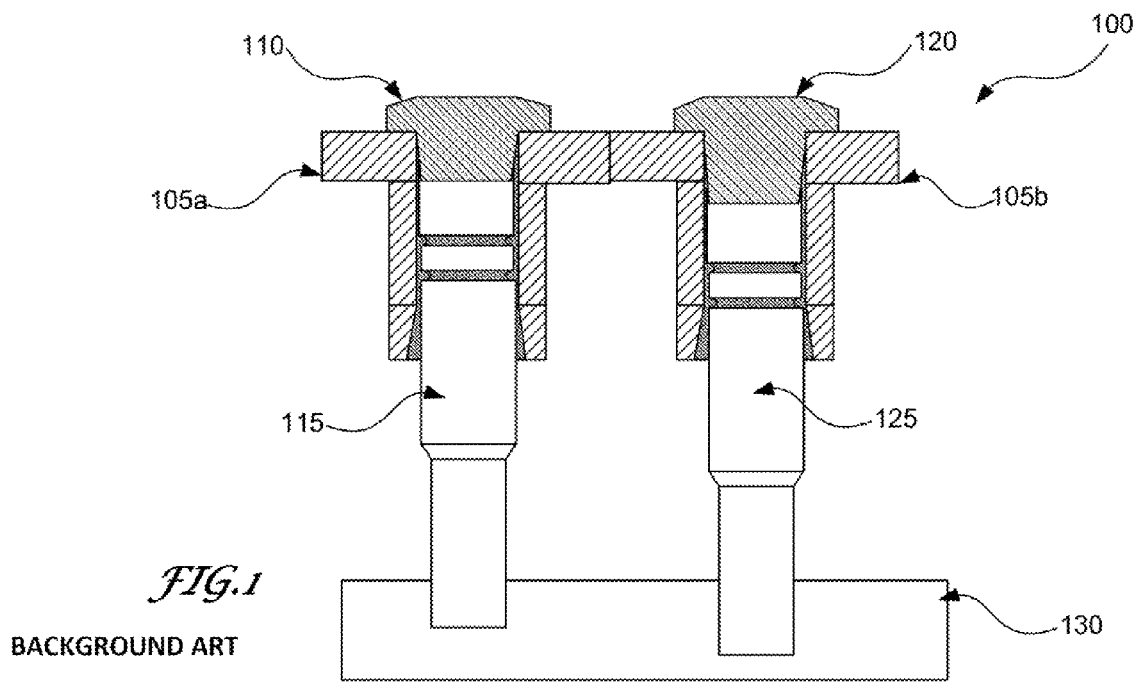
FIG. 1 shows a diagram of a section of a manufacturing system for integrated circuit compression molding wherein a two consecutive bushings are holding two different sized pellets that cannot be compensated for by the conventional plungers.

Turning to FIG. 1, a section 100 of a manufacturing system is shown with conventional plungers 115 and 125 that cannot compensate for differences in the mold compound encountered within bushings. During the molding process, carriers (such as a lead frame with an integrated circuit die mounted thereon) are preheated to allow metal and other materials in the carrier to expand. This may typically be done in a preheat chamber (not shown). Once properly preheated, the carrier (such as a lead frame with an attached IC die) may be loaded into a bottom mold cavity and aligned therein. Typically, aligning pins in the bottom mold cavity may be used to ensure that the carrier is positioned correctly within the bottom mold cavity. Then a top mold cavity may be aligned with the bottom mold cavity such that the two halves of the mold cavity are ready for mold compound to be injected. In FIG. 1, the top and bottom mold cavities and the aligned carrier are collectively shown as pellets 110 and 120 already assembled and ready for molding.

In FIG. 1, only two pot bushings 105a and 105b are shown and only two pellets 110 and 120 are shown loaded therein. However, it is understood that only two are shown here for ease of illustration and that a typical molding system may include several pot bushings and mold plungers within an array or line. Once the pellets 110 and 120 are ready, they may be loaded into a respective pot bushing 105a or 105b (sometimes called mold pots). A plunger assembly 130 will then engage the array of pot bushings in order to apply necessary pressure and temperature for the molding process to take. Thus, a first mold plunger 115 will engage a first pot bushing 105a housing a first pellet 110 and a second mold plunger 125 will engage a second pot bushing 105b housing a second pellet 120.

Once engaged, each mold plunger 115 and 125 may have mold compound (heated to a liquid state) injected into a respective pot bushing 105a or 105b and subsequently filling the housed mold cavity with mold compound. The plunger assembly 130 will push the liquid mold compound through each mold plunger 115 and 125 to a specific pressure that is designed to prevent any hollow spots inside the pellet 110 and 120 or any delamination or micro-gapping between the carrier and the mold compound. The plunger assembly 130 remains engaged until the mold compound has properly cured and proper alignment of each mold plunger within each pot bushing ensures maintaining proper pressure and temperature for quality packaging.

However, if any one of the mold plungers is misaligned, the temperature and pressure for all mold plungers within a respective pot bushing may be compromised. In one example of a common situation that leads to misalignment, one pellet 110 may not have a carrier loaded therein. This may be because at the end of a manufacturing run, the last remaining number of IC dies to package is less than the number or pot bushings in the molding system 100. Thus, one or more pot bushings may contain a pellet without a carrier. That is, as shown in FIG. 1, the pellet 110 does not include a carrier and is shown as not as thick as the pellet 120 that does have a carrier therein. Then, when the plunger assembly engages, one or more mold plungers may not properly align because of a missing carrier. Thus, as is shown in FIG. 1, the mold plunger 115 sits higher within the pot bushing 105a. This will invariably lead to a difference in pressure. As the plunger assembly attempts to compensate for the different pressure (typically lower) in this pot bushing 105a, other pot bushings, such as pot bushing 105b may be subjected to an increased pressure as a result of the entire assembly attempting to control for the compromised mold plunger 115. In practice, short runs of IC dies are simply not attempted because the resulting packages are likely to contain deformation or micro-gaps. Other misalignments may lead to similar problems even when a full run is attempted as discussed further with respect to FIG. 2.

Figure 2:
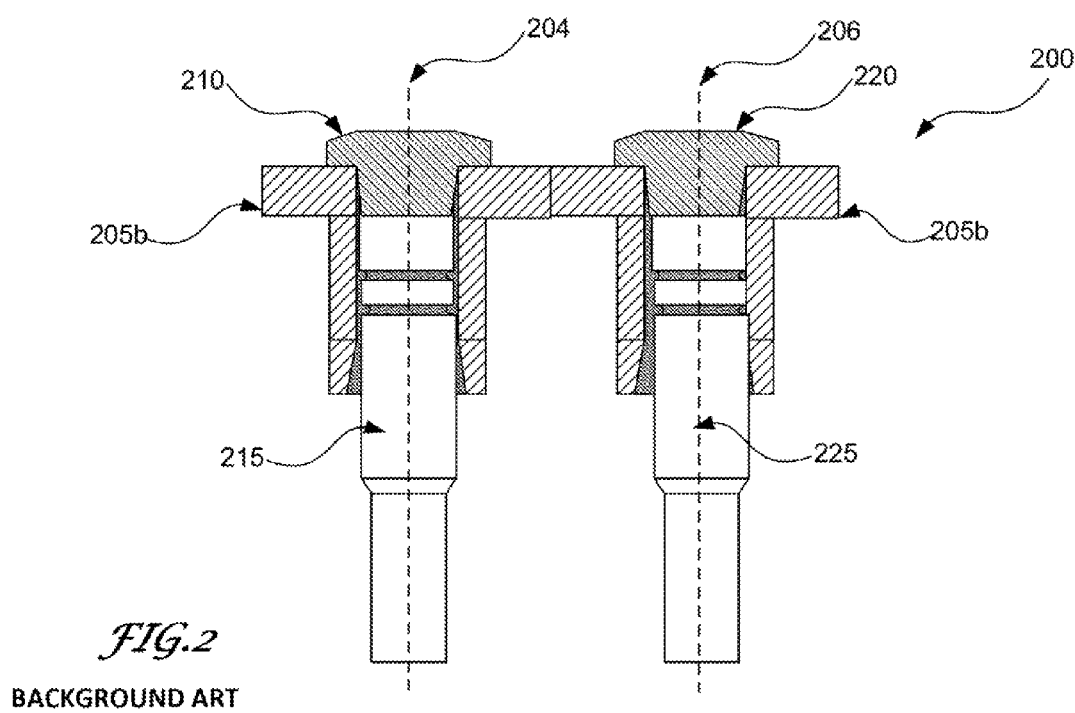
FIG. 2 shows a diagram of a section of a manufacturing system for integrated circuit compression molding wherein a bushing is misaligned with a conventional plunger.

FIG. 2 shows a diagram of a section 200 of a manufacturing system for integrated circuit compression molding wherein a bushing is misaligned with a conventional plunger. In this example of a failed molding process step, one can see a normal mold plunger alignment with a pot bushing 205a on the left of FIG. 2. Thus, a first mold plunger 215 is engaged with a pot bushing 205a having a pellet 210 loaded therein. This normal engagement has the mold plunger 215 aligned with the central axis 204 of the pot bushing 205a. On the right-hand side though, a mold plunger 225 is slightly misaligned with the central axis 206 of the second pot bushing 205b. As a result, the pressure applied to the pellet 220 will be compromised as it will be uneven with respect to the central axis 206 within the pot bushing 205b. The various misalignment situations, however, may be alleviated by using compensating mold plungers as described below with respect to FIGS. 3 and 4.

Figure 3:
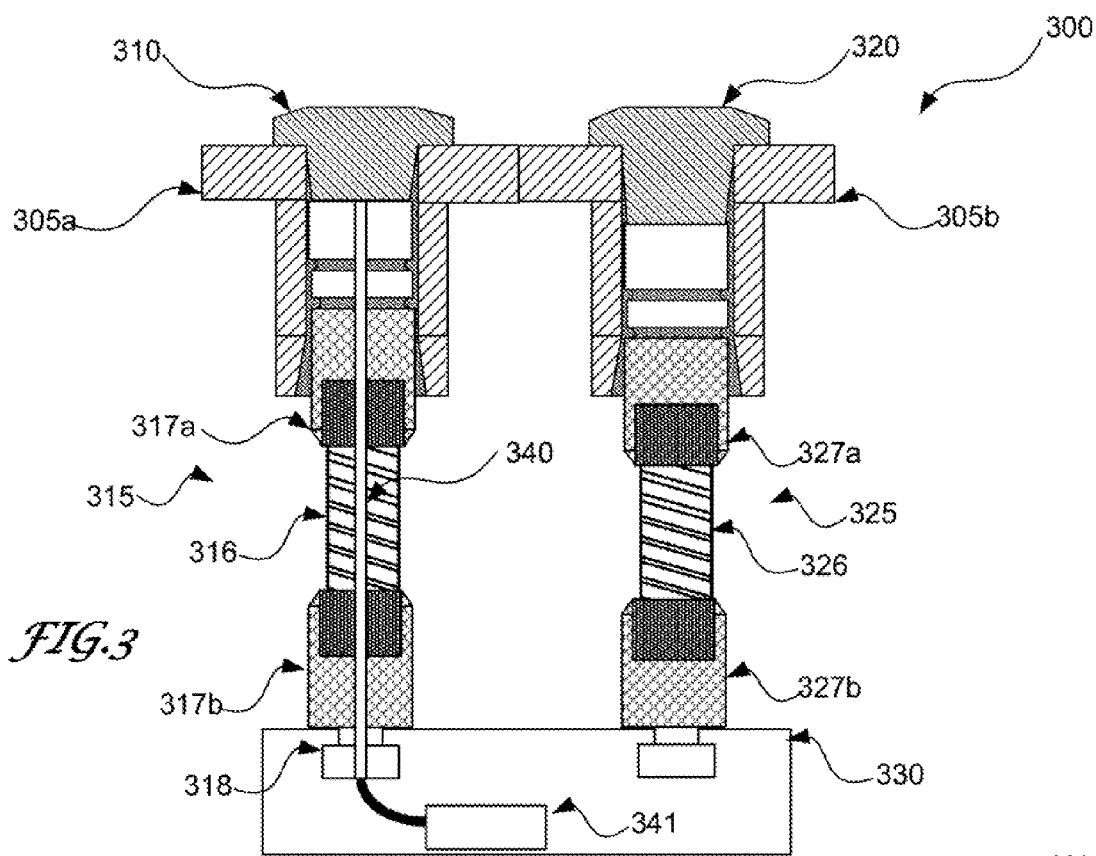
FIG. 3 shows a diagram of a section of a manufacturing system for integrated circuit compression molding wherein a two consecutive bushings are holding two different sized pellets that are compensated for by the plungers formed according an embodiment of the subject matter disclosed herein.

FIG. 3 shows a diagram of a section 300 of a manufacturing system for integrated circuit compression molding wherein a two consecutive bushings are holding two different sized pellets that are compensated for by the plungers formed according to an embodiment of the subject matter disclosed herein. In this embodiment, each plunger 315 and 325 is formed with having a flexible member attached to first and second rigid members. Thus, a first plunger 315 includes a first rigid member 317a attached to a flexible member 316 which is then attached to a second rigid member 317b. Likewise, a second plunger 325 also includes a first rigid member 327a attached to a flexible member 326 which is then attached to a second rigid member 327b. The flexible members allow for the plungers to compensate for slight misalignments during compression.

For example, in a first pot bushing 305b, one can see a pellet 320 loaded therein that is of a common size when a pellet 320 includes a carrier. Thus, the engaged mold plunger 325 is in contact with the pellet at an expected depth and, therefore, the system is designed to create the needed temperature and pressure conditions within the pot bushing 305b such that a mold compound will form a mold around the carrier within the pellet 320 properly. In the other pot bushing 305a shown, the pellet 310 is smaller because this pellet does not include a carrier inside (for example because of a short run or error in loading). Thus, the engaged mold plunger 315 is in contact with the empty pellet 310 at an unexpected depth. As a result, the flexible member 316 of this mold plunger 315 is able to expand or compress accordingly. That is, each of the flexible members is the mold plunger assembly 330 (e.g., flexible member 316 of mold plunger 315) is able to flex in a vertical direction so as to maintain an expected pressure against the loaded pellet 310. If the pellet is properly loaded (as with pellet 320), then the flexible member 326 of mold plunger 325 is able to contract vertically enough to apply an expected pressure against the loaded pellet 320. At the same time, if the pellet is improperly loaded (as with pellet 310), then the flexible member 316 of mold plunger 315 is able to expand vertically to still apply an expected pressure against the improperly loaded pellet 310.

With each plunger in the plunger assembly 330 applying the same pressure, each pot bushing may be balanced so as to provide an opportunity to deliver mold compound under optimal temperature and pressure conditions. Therefore, even when one or more pellets may be improperly loaded, the remaining properly loaded pellets will not be compromised by less-than-optimal temperature and pressure conditions because the mold plunger assembly cannot compensate. Thus, some units may be delaminated or have an incomplete filling and this typically results in the rejections of an entire lot of manufactured packages. Using a flexible member within the main body of a mold plunger for compensation for misalignment is an advantage over other kinds of mold plunger assemblies, such as hydraulic systems (which are problematic because of high maintenance and cleanliness) and spring-loaded systems (which are limited in their flexibility because of their mechanical nature).

The flexible member 316 of a mold plunger 315 may be made of a metallic or molded plastic spring. In other embodiments not shown, the flexible member may be a molded rubberized material. Further, the mold plunger may include a quick-release engagement mechanism 318 for easily attaching and removing the mold plunger 315 to the mold plunger assembly 330. Further, the mold plunger 315 may also include a canal 340 for injecting liquid mold compound into a respective pot bushing 305a from a reservoir 341 within the mold plunger assembly 330 (or elsewhere).

Figure 4:
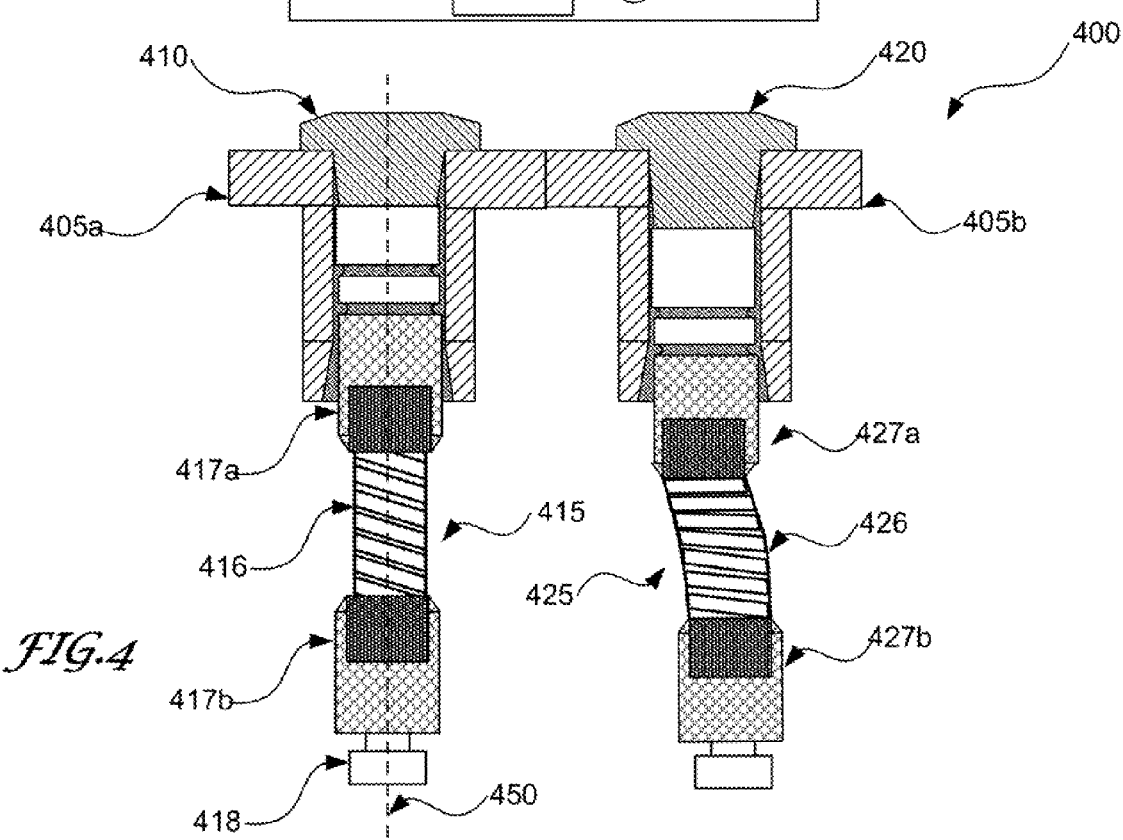
FIG. 4 shows a diagram of a section of a manufacturing system for integrated circuit compression molding wherein a bushing is misaligned with a plunger formed according to an embodiment of the subject matter discussed herein.

FIG. 4 shows a diagram of a section 400 of a manufacturing system for integrated circuit compression molding wherein a bushing is misaligned with a plunger formed according to an embodiment of the subject matter discussed herein. In this example embodiment, each plunger 415 and 425 is again formed with having a flexible member attached to first and second rigid members. Thus, a first plunger 415 includes a first rigid member 417a attached to a flexible member 416 which is then attached to a second rigid member 417b. Likewise, a second plunger 425 also includes a first rigid member 427a attached to a flexible member 426 which is then attached to a second rigid member 427b. As before, the flexible members allow for the plungers to compensate for slight misalignments during compression, but with this example, the misalignment may be due to a mold plunger misaligned with a central axis of a pot bushing.

For example, in a first pot bushing 405a, one can see a pellet 410 loaded therein that is of a common size when a pellet 410 includes a carrier. Thus, the engaged mold plunger 415 is in contact with the pellet at an expected depth and, therefore, the system is designed to create the needed temperature and pressure conditions within the pot bushing 405a such that a mold compound will form a mold around the carrier within the pellet 420 properly. Furthermore, one can see that the mold plunger 415 is aligned with the central axis 450 of the pot bushing 405a. Therefore, when engaging the pot bushing 405a, the mold plunger tip (e.g., rigid member 417a) is not impeded by the edge of the pot bushing 405a.

In the other pot bushing 405a shown, the mold plunger 425 is not correctly lined up with a central axis (not shown) of the pot bushing 405b. Thus, the engaged mold plunger 425 may be impeded or contacted by the edge of the pot bushing 405b. With a conventional mold plunger (as was shown in FIG. 2), the mold plunger top may damage the pot bushing or be damaged itself when this kind of misalignment is encountered. However, with a flexible member 426 in the mold plunger 425, the top rigid member 427a is able to translate position in order to properly seat within the pot bushing 405b. That is, each of the flexible members is the mold plunger assembly 330 (e.g., flexible member 426 of mold plunger 425) is able to flex in a lateral or transverse direction so as to maintain an expected pressure against the loaded pellet 420. If the pellet is properly loaded (as with pellet 420), then the flexible member 326 of mold plunger 325 is able to shift laterally enough to apply an expected pressure against the loaded pellet 420.

Such a mold plunger 425 having the ability to shift laterally will extend the life of the pot bushing 405b as well as the life of the mold plunger 425 as any damage that may result from misalignment impact may be mitigated by the compensating mold plunger 425 with a flexible member 426. Further, compensating mold plungers will be able to compensate any die quantity variation inside each panel and may be easily adjusted to the current manufacturing needs and capabilities. Cosmetic defects may be reduced significantly as an assembly of compensating mold plungers may allow for a more balanced flow of mold compound that cannot be compromised by one or two mold plungers misaligned or with missing dice that may lead to variable temperature and pressure conditions.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A mold plunger, comprising:
    a rigid member configured to engage a pot bushing in a first direction, wherein the pot bushing includes a through opening having a central axis; and
    a flexible member attached to the rigid member and free from lateral constraints, the flexible member allowing the rigid member to move in a second direction lateral to the first direction to align a central axis of the rigid member with the central axis of the through opening.

2. The mold plunger of claim 1, wherein the flexible member comprises a metallic spring.

3. The mold plunger of claim 1, wherein the flexible member comprises a rubberized material.

4. The mold plunger of claim 1, further comprising a quick-release mechanism disposed on an end of the mold plunger.

5. The mold plunger of claim 1, further comprising an internal canal configured to deliver a mold compound to an engaged pot bushing.

6. The mold plunger of claim 1, wherein the rigid member comprises a rigid member central axis and the flexible member comprises a flexible member central axis such that the rigid member central axis and the flexible member central axis are aligned with each other when the mold plunger is not engaged with a pot bushing.

7. The mold plunger of claim 6, wherein the pot bushing comprises a pot bushing central axis such that when the mold plunger is engaged with the pot bushing, the rigid member axis is aligned with the pot bushing central axis.

8. The mold plunger of claim 1, wherein the flexible member is configured to flex in a vertical direction.

9. The mold plunger of claim 1, wherein the flexible member is configured to flex in a transverse direction.

10. The mold plunger of claim 1, wherein the rigid member is a first rigid member, the mold plunger further comprising a second rigid member coupled to an end of the flexible member.

11. A packaging system, comprising:
    at least one fixed pot bushing having a through opening to receive an object for packaging, the through opening extending in a first direction; and
    at least one mold plunger, comprising:
        a rigid member having a first end and a second opposite end, the first end being configured to be received in the through opening of the pot bushing; and
        a flexible member attached to the rigid member at the second end, the flexible member allowing the rigid member to move in a second direction lateral to the first direction to align with the through opening of the pot bushing.

12. The mold plunger of claim 11, wherein the rigid member comprises a rigid member central axis and the flexible member comprises a flexible member central axis such that the rigid member central axis and the flexible member central axis are aligned with each other when the mold plunger is not engaged with a pot bushing.

13. The mold plunger of claim 12, wherein the pot bushing comprises a pot bushing central axis such that when the mold plunger is engaged with the pot bushing, the rigid member axis is aligned with the pot bushing central axis.

14. The mold plunger of claim 11, wherein the flexible member is configured to flex in a lateral direction.

15. The mold plunger of claim 11, wherein the flexible member is configured to flex in a vertical direction.

16. A system for integrated circuit molding, comprising:
    an array of fixed pot bushings having openings, each opening configured to receive an integrated circuit assembly ready for molding;
    a mold plunger assembly including an array of mold plungers, each mold plunger, comprising:
        a rigid member having a first end and a second opposite end, the first end being configured to be received in a respective one of the openings of the pot bushings; and a flexible member attached to the rigid member at the second end, the flexible member allowing the rigid member to laterally align with the respective opening of the pot bushing; and a heating system configured to maintain a temperature and pressure within each pot bushing for a duration of a molding process.

17. The system of claim 16, wherein each mold plunger is attached to the mold assembly via a quick-release attachment mechanism.

18. The system of claim 16, wherein the integrated circuit assembly ready for molding further comprises:
a top mold cavity;
a bottom mold cavity attached to the top mold cavity;
a carrier disposed between the top mold cavity and bottom mold cavity; and
an integrated circuit die disposed on the carrier.

19. The system of claim 16, further comprising a preheating system configured to heat each integrated circuit assembly prior to being received by a respective one of the pot bushings.

20. The system of claim 16, wherein the openings of the pot bushings are through openings.

21. A mold plunger assembly, comprising:
a base structure;
an array of mold plungers, each mold plunger including:
a first end that is a first rigid member coupled to the base structure;
a second end that is opposite the first end, the second end being a second rigid member that is configured to engage a pellet inside a through opening of a pot bushing; and
a flexible member located between the first and second rigid members, the flexible member allowing the second rigid member to align with a central axis of a through opening of the pot bushing.

22. The mold plunger of claim 21, wherein the flexible member comprises a metallic spring.

23. The mold plunger of claim 21, wherein the flexible member is configured to flex in a lateral direction.

24. The mold plunger of claim 21, wherein the flexible member is configured to flex in a vertical direction.

25. The mold plunger of claim 21, wherein the flexible member is configured to flex in a transverse direction.

26. A mold plunger, comprising:
a rigid member configured to be received in an opening of a fixed pot bushing, the opening having a central axis in a first direction; and
a flexible member having an end coupled to the rigid member, the flexible member allowing the rigid member to move in a second direction lateral to the first direction to align a central axis of the rigid member with the central axis of the opening in the pot bushing.

27. The mold plunger of claim 26, wherein the flexible member includes at least one of a metallic spring and a rubberized material.

* * * * *